US009626728B2

(12) United States Patent
Chakraborty et al.

(10) Patent No.: US 9,626,728 B2
(45) Date of Patent: *Apr. 18, 2017

(54) SOCIAL NETWORK SYSTEM WITH SOCIAL OBJECTS

(71) Applicant: Oracle International Corporation, Redwood Shores, CA (US)

(72) Inventors: Sayan Chakraborty, Niwot, CO (US); Terry M. Olkin, Niwot, CO (US); Jeffrey Olkin, Princeton, NJ (US); Daniel G. Rabe, Lafayette, CO (US); Lenny Karpel, Lyons, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,376

(22) Filed: Apr. 15, 2016

(65) Prior Publication Data

US 2016/0232619 A1    Aug. 11, 2016

Related U.S. Application Data

(63) Continuation of application No. 13/622,071, filed on Sep. 18, 2012, now Pat. No. 9,330,419.

(Continued)

(51) Int. Cl.
*G06F 15/16* (2006.01)
*G06Q 50/00* (2012.01)
(Continued)

(52) U.S. Cl.
CPC ......... *G06Q 50/01* (2013.01); *G06F 17/3056* (2013.01); *G06F 17/30377* (2013.01);
(Continued)

(58) Field of Classification Search
CPC ..... G06Q 50/01; G07F 17/3225; H04L 51/32; H04L 67/22; H04L 63/10; H04L 51/14;
(Continued)

(56) References Cited

U.S. PATENT DOCUMENTS 6,662,164 B1    12/2003  Koppelman et al.
7,447,647 B1    11/2008  Shedlack
(Continued)

FOREIGN PATENT DOCUMENTS

WO    2009120775 A1    10/2009
WO    2011163147 A3    3/2012

OTHER PUBLICATIONS

A. Wable; "Intro to Facebook Search"; Mar. 16, 2010; http://www.facebook.com/note.php?note_id=365915113919.
(Continued)

*Primary Examiner* — Djenane Bayard
(74) *Attorney, Agent, or Firm* — Miles & Stockbridge P.C.

(57) ABSTRACT

A social network system provides a social network that receives from an application a business object and an associated system of record and generates a social object that corresponds to the business object and that comprises the system of record for the enterprise application. The social network assigns one or more members to the social object. The social network receives first changes to the system of record and, in response, modifies the social object to incorporate the first changes. The system provides second changes to the social object to the enterprise application, and the enterprise application, in response, modifies the system of record to incorporate the second changes.

20 Claims, 11 Drawing Sheets

Related U.S. Application Data

(60) Provisional application No. 61/640,913, filed on May 1, 2012.

(51) Int. Cl.
*G06F 17/30* (2006.01)
*G06Q 10/10* (2012.01)
*H04L 12/58* (2006.01)

(52) U.S. Cl.
CPC ............. *G06Q 10/10* (2013.01); *H04L 51/16* (2013.01); *H04L 51/32* (2013.01)

(58) Field of Classification Search
CPC ..... H04L 65/4084; H04L 67/18; H04L 67/42; H04L 65/403
See application file for complete search history.

(56) References Cited

U.S. PATENT DOCUMENTS

| | | |
|---|---|---|
| 7,739,139 B2 | 6/2010 | Robertson et al. |
| 8,171,087 B2 | 5/2012 | Carrer |
| 8,819,150 B1 | 8/2014 | Osinga |
| 9,253,137 B1 | 2/2016 | Jackson |
| 2004/0122803 A1 | 6/2004 | Dom et al. |
| 2004/0128285 A1 | 7/2004 | Green |
| 2005/0022058 A1 | 1/2005 | Fechser |
| 2005/0223058 A1 | 10/2005 | Buchheit |
| 2006/0064434 A1 | 3/2006 | Gilbert et al. |
| 2008/0103907 A1 | 5/2008 | Maislos et al. |
| 2008/0109741 A1 | 5/2008 | Messing |
| 2008/0147487 A1 | 6/2008 | Hirshberg |
| 2009/0222448 A1 | 9/2009 | Caldwell et al. |
| 2009/0222750 A1 | 9/2009 | Jain et al. |
| 2009/0305732 A1 | 12/2009 | Marcellino et al. |
| 2009/0307592 A1 | 12/2009 | Kalanithi et al. |
| 2010/0070485 A1 | 3/2010 | Parsons et al. |
| 2010/0082695 A1 | 4/2010 | Hardt |
| 2010/0169134 A1 | 7/2010 | Cheng et al. |
| 2010/0169159 A1 | 7/2010 | Rose et al. |
| 2010/0169327 A1 | 7/2010 | Lindsay et al. |
| 2010/0174747 A1 | 7/2010 | Farrell et al. |
| 2010/0198757 A1 | 8/2010 | Cheng et al. |
| 2010/0211917 A1 | 8/2010 | Tsuei |
| 2010/0318613 A1 | 12/2010 | Souza et al. |
| 2010/0325107 A1 | 12/2010 | Kenton et al. |
| 2011/0011349 A1 | 1/2011 | Allis |
| 2011/0035677 A1 | 2/2011 | Vitale et al. |
| 2011/0113072 A1 | 5/2011 | Lee |
| 2011/0137902 A1 | 6/2011 | Wable |
| 2011/0161827 A1 | 6/2011 | Dedis et al. |
| 2011/0179025 A1 | 7/2011 | Chuang |
| 2011/0246920 A1 | 10/2011 | Lebrun |
| 2011/0314017 A1 | 12/2011 | Yariv et al. |
| 2012/0001919 A1 | 1/2012 | Lumer |
| 2012/0011039 A1* | 1/2012 | Cina ................. G06Q 10/06 705/35 |
| 2012/0143972 A1 | 6/2012 | Malik et al. |
| 2012/0158501 A1 | 6/2012 | Zhang et al. |
| 2012/0197809 A1 | 8/2012 | Earl et al. |
| 2012/0290448 A1* | 11/2012 | England ............ G06Q 30/0282 705/27.2 |
| 2012/0290950 A1 | 11/2012 | Rapaport |
| 2012/0331053 A1 | 12/2012 | Dunn |
| 2013/0024511 A1 | 1/2013 | Dunn et al. |
| 2013/0024788 A1 | 1/2013 | Olsen et al. |
| 2013/0073280 A1 | 3/2013 | O'Neil et al. |
| 2013/0091217 A1 | 4/2013 | Schneider |
| 2013/0097320 A1 | 4/2013 | Ritter |
| 2013/0166721 A1 | 6/2013 | Soffer |
| 2013/0173368 A1 | 7/2013 | Boutin et al. |
| 2013/0185143 A1 | 7/2013 | Damman et al. |
| 2013/0193368 A1* | 8/2013 | Low .................... C08J 9/146 252/68 |
| 2013/0198275 A1 | 8/2013 | Forsblom |
| 2013/0262595 A1 | 10/2013 | Srikrishna et al. |
| 2014/0012927 A1 | 1/2014 | Gertzfield |
| 2014/0189524 A1 | 7/2014 | Murarka et al. |
| 2014/0189539 A1 | 7/2014 | St. Clair et al. |

OTHER PUBLICATIONS

About the Discussion Board; http:help.blackboard.com/instructor/content/_instructor_course/instructor_course_tool; last accessed on May 23, 2012.
Bing Search Quality Insights: Whole Page Relevance; http://www.bing.com/community/site_blogs/b/search/archive/2012/03/05/bing-search-quality-insights-whole-page-relevance.aspx; last downloaded Jun. 1, 2012.
Enterprise Search Relevance Architecture Overview, Office 2007, msdn; http://msdn.microsoft.com/en-us/library/ms549085%28v=office.12%29.aspx; last downloaded Jun. 1, 2012.
F The Oracle Text Scoring Algorithm; Oracle Text Reference; 11g Release 2 (11.2); http://docs.oracle.com/cd/E14072_01/text.112/e10944/ascore.htm; last downloaded Dec. 18, 2012.
Groofer get group smart; "What is groofer"; http://www.groofer.com/what-is-groofer; last downloaded Jun. 1, 2012.
How do I mark a message as read or unread?—Facebook Help Center/Facebook; http://www.facebook.com/help/?faq=213183835379234; last accessed on May 23, 2012.
http://learn.linkedin.com/inbox; last accessed on May 23, 2012.
Improving Relevance Office 2007; msdn; http://msdn.mircorsoft.com/en-us/library/ms584432(d=printer,v=office.12); last downloaded Jun. 1, 2012.
PinguyOS; http:/forum.pinguyos.com/index.php; last accessed on May 23, 2012.
Plugins http://buddypress.org/extend/plugins/?search=BP+unread+post; last accessed on May 23, 2012.
Quickstart Guide: What Matters—Communications\Jive Community; https://community.jivesofware.com/docs/DOC-43665; Aug. 1, 2011.
SB. Hecht et al.; "SearchBuddies: Bringing Search Engines into the Conversation"; Association for the Advancement of Artificial Intelligence; 2012.
Site Update: Unread Message Counts, Sta.sh Updates by $danlev and deviantArt; http://http://danlev.deviantart.com/Journal/Site-Update-Unread-Message-Counts-Sta-sh-Updates-289171986?moodonly=1; last accessed on May 23, 2012.
Socialcast; http://socialcast.com/team-collaboration; last accessed on May 23, 2012.
TDash-Online Twitter Client That Makes Managing Unread Tweets Easy; http://www.makeuseof.com/tag/webbased-twitter-client-tdash-lets-manage-unread-tweets-ease/; last accessed on May 23, 2012.
Twitter Help Center; "About Top Seach Results"; https://support.twitter.com/articles/131209-what-are-top-tweets; last downloaded Jun. 1, 2012.
Unread Posts <<bbPress Plugin Browser; http://bbpress.org/plugins/topic/unread-posts/; last accessed on May 23, 2012.
www.yammer.com; "Introducing: Group Counters & Network Notifications" 2011.
"Data Sheet for Salesforce Chatter", http://www.salesforce.com/events/docs/DS_Chatter_2010-04-02.pdf; last downloaded Sep. 18, 2012.
"Salesforce Chatter" http://www.salesforce.com/crm/sales-force-automation/sales-tracking/; last downloaded Jun. 5, 2012.
"IdeaPlaneKinetic Product"; http://ideaplane.com/products/features; copyright 2010-2012—IdeaPlane, last downloaded Jun. 5, 2012.
"Mark as Read for WordPress"; http://codecanyon.net/item/mark-as-read-for-wordpress/696983; last downloaded Jun. 5, 2012.
"Mapping Search Relevance to Social Networks"; http://www.socialnetworkanalysis.info/snakdd2009/AcceptedPapers/snakdd2009_submission_7.pdf; the 3rd SNA-KDD Workshop '09 (SNA-KDD'09), Jun. 28, 2009; Paris, France; Copyright 2009; ACM978-I-59593-848-0.

(56) References Cited

OTHER PUBLICATIONS

Clearvale Enterprise: The complete business social networking solution; http://www.clearvale.com/clearvale/mkt-nav/en/collateral/Clearvale_Enterprise.pdf; Redwood City, CA.
"IBM Connections"; http://www-01.ibm.com/software/lotus/products/connections/features.html?S_CMP=rnav; last downloaded Jun. 5, 2012.
Oracle Data Sheet; "Oracle on Track Communication"; 2011.
Oracle, "Oracle on Track Communication White Paper"; Mar. 2011.

* cited by examiner

SOCIAL NETWORK SYSTEM WITH SOCIAL OBJECTS

CROSS REFERENCE TO RELATED APPLICATIONS

This application is a continuation application of U.S. application Ser. No. 13/622,071 filed on Sep. 18, 2012 which claims priority of Provisional Patent Application Ser. No. 61/640,913, filed on May 1, 2012, the contents of each which is hereby incorporated by reference.

FIELD

One embodiment is directed generally to a networked computer system, and in particular to a social network system with social objects.

BACKGROUND INFORMATION

A social network service or system, or "social network", is an online service, platform, or site that focuses on facilitating the building of social networks or social relations among people who, for example, share interests, activities, backgrounds, or real-life connections. A social network service typically includes a representation of each user, typically referred to as a user "profile", his/her social links, and a variety of additional services. Most social network services are web-based and provide means for users to interact over the Internet, such as e-mail and instant messaging. Social networking sites allow users to share ideas, activities, events, and interests within their individual networks.

The use of social network services in an enterprise/business context is increasingly becoming more popular. Because social networks connect people at low cost, they can be beneficial for entrepreneurs and small businesses looking to expand their contact bases. These networks often act as a customer relationship management tool for companies selling products and services. Companies can also use social networks for advertising in the form of banners and text ads. Since businesses operate globally, social networks can make it easier to keep in touch with contacts around the world.

SUMMARY

One embodiment is a social network system that provides a social network that receives from an application a business object and an associated system of record and generates a social object that corresponds to the business object and that comprises the system of record for the enterprise application. The social network assigns one or more members to the social object. The social network receives first changes to the system of record and, in response, modifies the social object to incorporate the first changes. The system provides second changes to the social object to the enterprise application, and the enterprise application, in response, modifies the system of record to incorporate the second changes.

BRIEF DESCRIPTION OF THE DRAWINGS

FIG. 4 is a screenshot showing another example social object in accordance with one embodiment of the present invention.

FIG. 6 is a screenshot showing an example business object within an enterprise application in accordance with an embodiment of the present invention.

DETAILED DESCRIPTION

One embodiment is a social network system that creates social objects that correspond to business objects from enterprise business applications. The social object includes a wall that displays changes to the system of record of the business object. Multiple conversations for a single social object can be related to the social object and can be stored and accessed at a future date.

Figure 1:
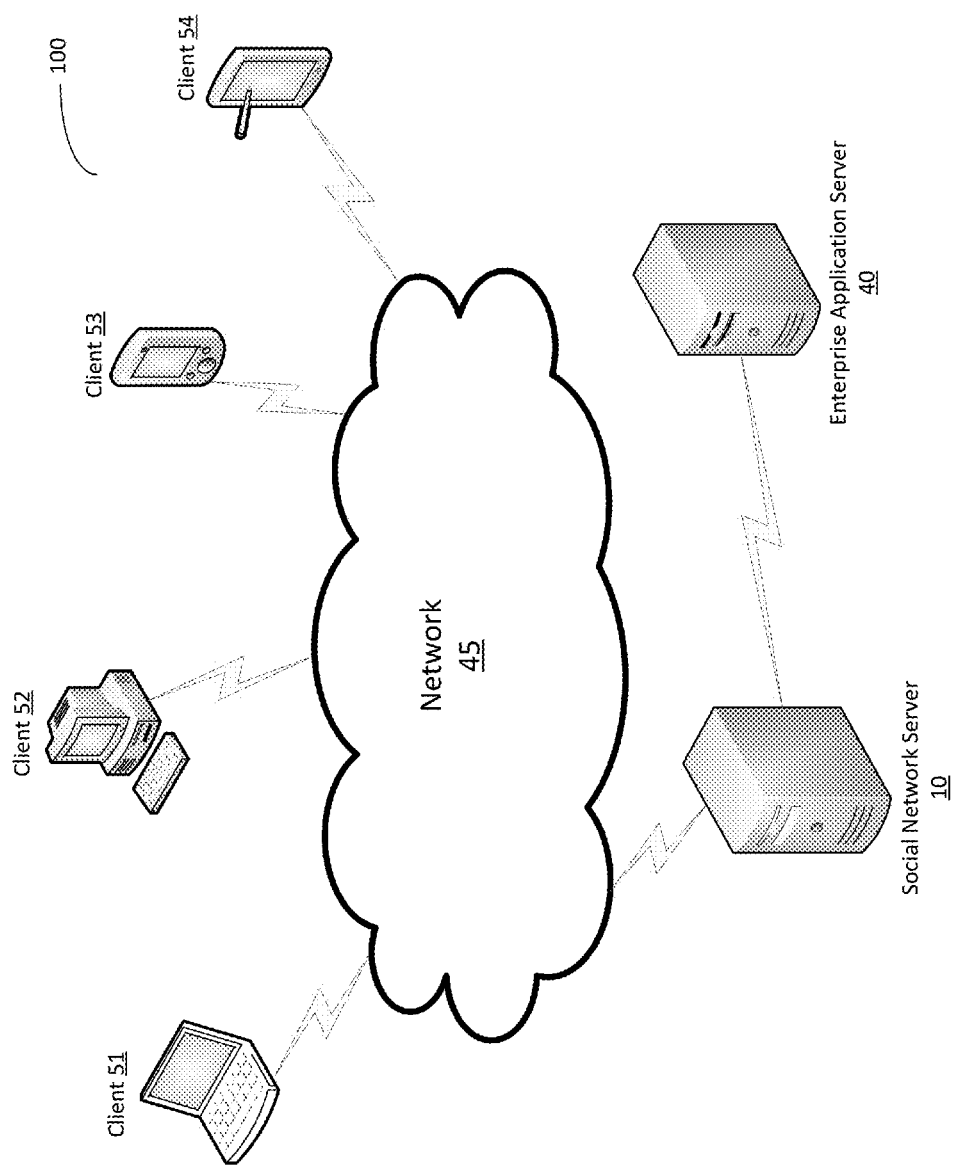
FIG. 1 is an overview block diagram of an example of a social network in accordance with embodiments of the present invention.

FIG. 1 is an overview block diagram of an example of a social network 100 in accordance with embodiments of the present invention. Social network 100 includes a social network server/system 10 coupled to client devices 51-54 through a network 45. Network 45 can by any type of communication network, such as the Internet or an Intranet or other private network. Client devices 51-54 can be any type of device that allows a user to interface with server 10, including a laptop computer 51, a desktop computer 52, a smart phone 53, a tablet 54, etc., using a wired or wireless connection, or any other method. Further, in other embodiments, a user can interface directly with server 10 (i.e., not via a network) through a directly coupled client device (not shown). Client devices 51-54 execute a web browser or other functionality that provides an interface with server 10.

Social network server/system 10, in conjunction with the other devices of FIG. 1, substantially provides the functionality of a social network with social object conversations related to a social object, as disclosed in more detail below. Social network server 10 is coupled to an enterprise application server 40. Enterprise application server 40 in one embodiment is a server or servers that execute enterprise applications, such as human resource ("HR") applications, customer relationship management ("CRM") applications, enterprise resource planning ("ERP") applications, etc. In one embodiment, the enterprise applications on server 40 are the "E-Business Suite" or "Fusion" applications from Oracle Corp. Server 10 can be directly coupled to server 40, can be coupled in any other way such as over a network. In addition, the functionality of server 40 can be included on server 10. Further, server 40 can be coupled to clients 51-54 directly through a network or other means rather than through server 10. Server 40 is generally not part of social network 100, but provides the business objects and system of records that are used to generate social objects.

Figure 2:
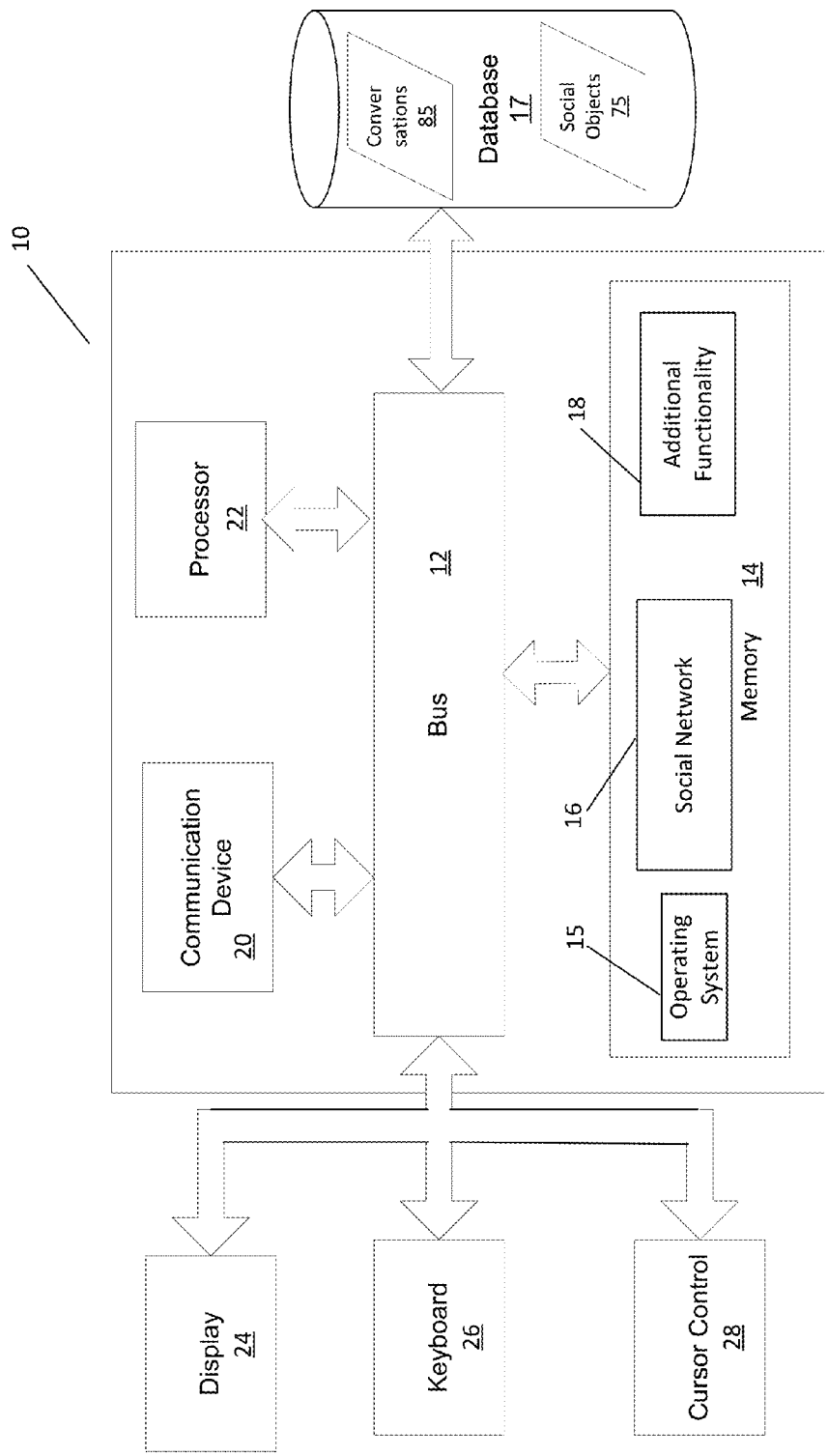
FIG. 2 is a block diagram of the social network server/system of FIG. 1 in accordance with an embodiment of the present invention.

FIG. 2 is a block diagram of social network server/system 10 of FIG. 1 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a social network module 16 for providing social network functionality, as disclosed in more detail below. System 10 can be part of a larger system, such as an ERP system, if that functionality is not already provided by server 40 of FIG. 1. Therefore, system 10 can include one or more additional functional modules 18 to include the additional functionality. A database 17 is coupled to bus 12 to provide centralized storage for modules 16 and 18 and store data such as user profiles, social objects 75, conversations 85, etc. Storage of these items can also be done remote from system 10.

In one embodiment, social network 100 of FIG. 1 is a secure enterprise collaboration and social network software application and platform designed to facilitate social interactions within the enterprise environment (as opposed to a consumer environment) connecting people, applications and business processes within and across businesses. Social network 100 includes user profiles, conversations 85 and social objects 75.

A "conversation" in social network 100 in one embodiment is a persistent, shared stream of posts and comments (i.e., messages) including, for example, text, rich-text, documents, audio, video, programmatic content (referred to as "gadgets"), etc. A conversation has a defined membership ranging from "Private" (i.e., membership of one/self), through N-members consisting of individuals and or groups of individuals or sub-groups, to "Public" with visibility open across all members of social network 100. Posts within a conversation are viewed with new posts beneath old posts (i.e., multiple posts can be read as text on a page in a book), or vice versa, or in any type of hierarchical format.

One embodiment generates social objects. All data from enterprise applications and business processes can potentially be socialized as a "social object." Social objects contain records from a business application or process (referred to as a "system of record") that are mapped as a visual and programmatic integration into social network 100 via social network server 10. For example, a sales opportunity from within a CRM enterprise application (e.g., the name of a sales prospect and related data for the sales prospect, such as the estimated probability that a sale will close, the expected revenue of the sale, etc.) is integrated into social network 100 as a social object. As a result, social objects are explicitly coupled with conversations, where the social object can be discussed in context, and a record of that discussion can be retained for future viewing.

In one embodiment, a social object in social network 100 includes the following:

A set of programmatic rules defining the behavior of the integration and actions on receiving business events from the object within the system of record (i.e., the business object in the enterprise application).

A "wall" (i.e., a stream of posts) displaying publication of changes in the data set of the associated object from within the system of record and status posts from members/users of social network 100 with appropriate access rights. The wall provides an activity stream holding short, sometimes unrelated posts in which old information may scroll off the bottom of the list. The wall differs from a conversation in which all content is related.

A set of related conversations or other social objects (e.g., a "Customer" social object can be related to multiple "Opportunity" social objects).

A membership potentially defined, controlled and managed by the system of record or open to sharing across the network with individuals and groups.

A "gadget" storing data from the associated object within a system of record allowing quick access and updates to the original data set within the system of record (e.g., the revenue value of a CRM opportunity is displayed within a gadget and a member with access to the corresponding opportunity social object and the appropriate access rights within the system of record can update the revenue value in the system of record from the gadget tied to the social object within social network 100).

A social object may be generated for social network 100 for any business object of an application that users may desire to collaborate on over social network 100. Examples of social objects include (1) an "Opportunity" social object from a CRM application; (2) a "Customer" social object from a CRM application; (3) a "Service Request" social object from a CRM application; (4) a "Business Process Shipment Escalation" social object from a business process application; (5) a "Portal" subject social object from a web portal application; (6) a "General Ledger Period Close" social object from a financial/ERP application; (7) an "Inventory Item" social object from an inventory/ERP application; and (8) an "Ordered Product" social object from a distributed order orchestration application (e.g., "Fusion Distributed Order Orchestration (DOO)" application from Oracle Corp.).

In one embodiment, a conversation for social network 100 can be created for any collaborative purpose, including having a specific discussion, making a decision or resolving a problem. A conversation can be related to a social object. The conversation can have membership which is identical, a superset or a subset of the social object membership. For example, a conversation can be created that is related to a sales opportunity social object in which the sales team works on preparing the presentation for the customer. A second related conversation can be created in which only the sales lead works with the legal team in reviewing contractual changes requested by the customer. Through related conversations, multiple, parallel threads of work between different constituent parties all related to the changing of state of an object within the system of record (e.g., the opportunity changes from a state of "Negotiation" to a state of "Won") is achieved while maintaining the relationship, understanding and contextual persistent of the collaboration that drove the changes. For example, related conversations for an Opportunity social object may include a conversation for preparing a presentation, with the suggested presentation content and best practice notes for delivery, and a conversation for finalizing the contract with the appropriate draft contract for the deal size, industry, product and sales region with the associated legal team member added. A social object can also be related to another social object.

Figure 3:
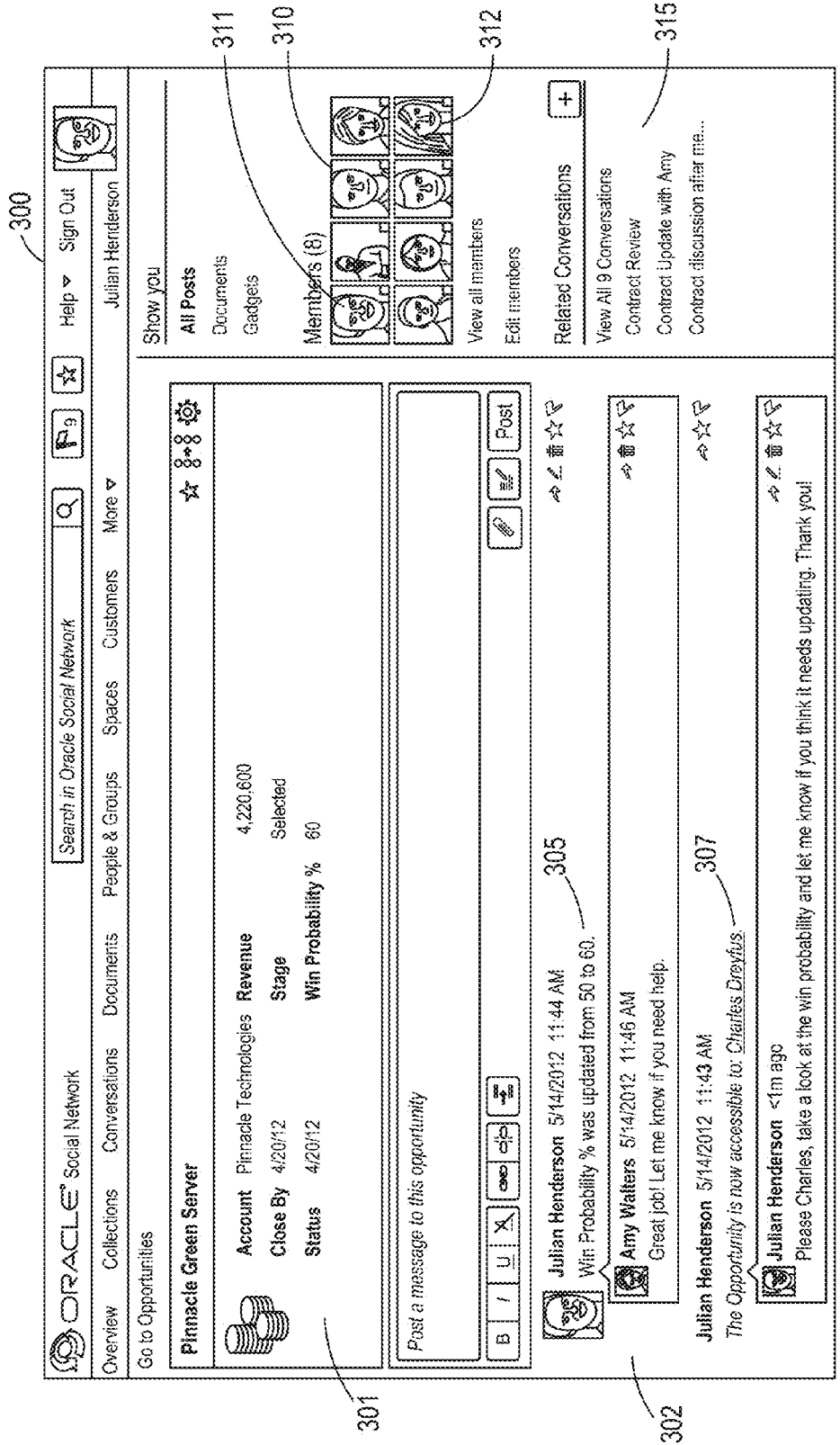
FIG. 3 is a screenshot showing an example social object in accordance with one embodiment of the present invention.

FIG. 3 is a screenshot showing an example social object 300 in accordance with one embodiment of the present invention. Social object 300 shown in FIG. 3 is an Opportunity social object for a "Pinnacle Green Server" product. As shown at 301, information or properties for social object 300 includes the account name ("Pinnacle Technologies"), the expected date of close of the opportunity (Apr. 20, 2012), the expected revenue from the opportunity ($4,220,600), and the probability of success or "win" (60%). The information at 301 is comprised of the properties from the systems of record of a CRM system that may be external to social network system 100, such as from server 40 of FIG. 1. The properties of 301 are automatically updated as they are updated/changed in the CRM enterprise system. Further, in one embodiment, the properties can be edited in social object 300, and the edits/changes automatically update the properties in the system of record of the enterprise system. Therefore, the updating of data/properties can flow in both directions: from the enterprise application to the social network, and vice versa.

Social object 300 further includes a wall 302 that shows a history of all of the changes that have occurred on the social object. For example, at 305, the win probability is shown to have been updated by "Julian Henderson" from 50% to 60% on May 14, 2012 at 11:44 a.m. At 307, a new member, "Charles Dreyfus" was given access to the social object on May 14, 2012 at 11:43 a.m.

Social object 300 further includes a list of all members of the social object at 310. The members who are currently online for that social object (e.g., member 311) are shown with a typical thumbnail picture, but members who are currently offline (e.g., member 312) are shown as a grayed out thumbnail picture.

Social object 300 further includes a list of all conversations related to social object 300 at 315. A user can view one of the conversations by selecting the conversation. In one embodiment, social object 300 and new related conversations such as related conversations 315 are created when the user is interacting with the external or third party enterprise system such as a CRM or ERP system executing on, for example, server 40 of FIG. 1. For a given business object within a system of record of an enterprise application, a social object and a customized set of related conversations with content can be created programmatically (e.g., as a pre-defined template) to assist with the collaboration required to change the state of the system of record. In one embodiment, an application programming interface ("API") from the enterprise application to the social network application allows changes in the system of record to be communicated to the social network system, and vice versa. A selectable list of other social objects that are related to social object 300 can also be displayed.

Figure 4:
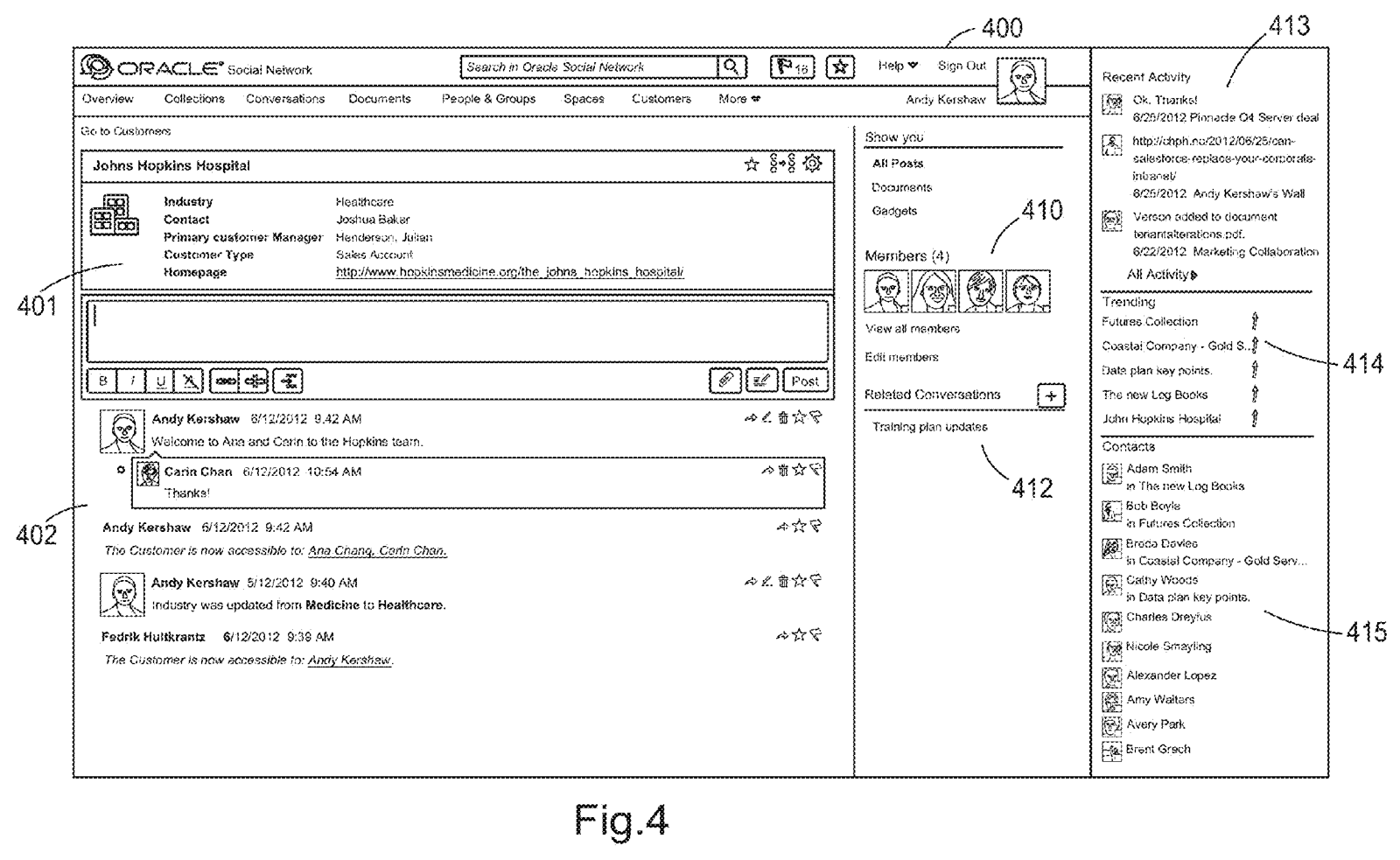

FIG. 4 is a screenshot showing another example social object 400 in accordance with one embodiment of the present invention. Social object 400 shown in FIG. 4 is a Customer social object for a customer named "Johns Hopkins Hospital". The customer in one embodiment is generated from a business object and updated from a system of record of a CRM system. The information properties for social object 400 are shown at 401, and the wall is shown at 402. Social object 400 further includes a display of members at 410 and a list of related conversations at 412. Social object 400 further includes a listing of recent activity at 413, trending activity at 414, and selectable contact information for each member at 415 (which may be the members of social object 400, or a list of contacts specific to each user).

Figure 5:
FIG. 5 is a screenshot showing another example social object in accordance with one embodiment of the present invention.

FIG. 5 is a screenshot showing another example social object 500 in accordance with one embodiment of the present invention. Social object 500 shown in FIG. 5 is a General Ledger Period Close social object for the "Vision US Q1 2012" period close. The period closing financial information in one embodiment is generated from a business object and updated from a system of record of a financial/ERP system. The information properties for social object 500 are shown at 501, and the wall is shown at 502. Social object 500 further includes the same elements as social object 400 of FIG. 4

Figure 6:
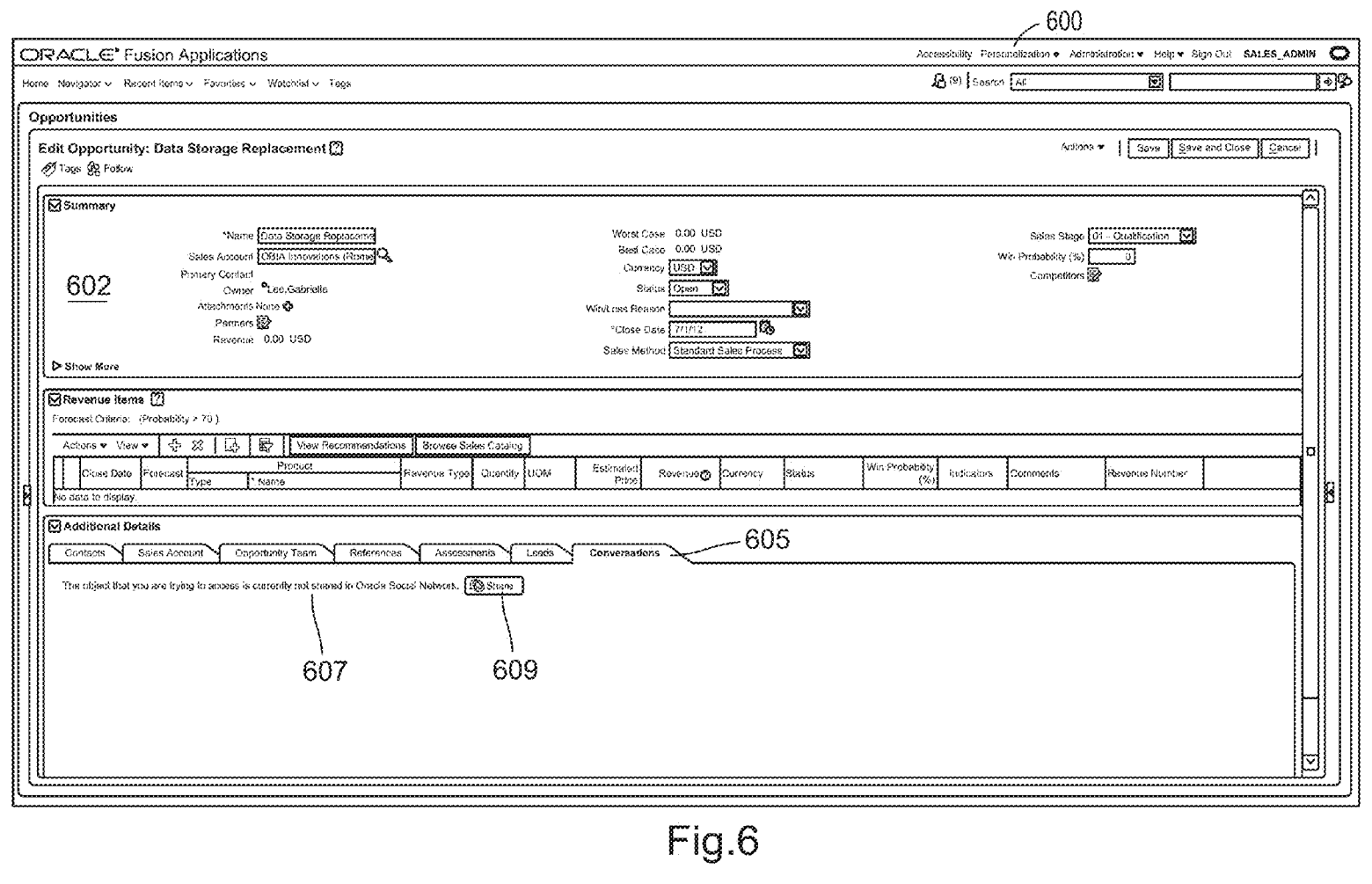

FIG. 6 is a screenshot showing an example business object 600 within an enterprise application in accordance with an embodiment of the present invention. Business object 600 is an "Opportunity" object named "Data Storage Replacement" within a CRM system. The summary section 602 provides the system of record properties for the object. Business object 600 provides links to a corresponding social object in social network 100. Specifically, a tab 605 can be selected to create a conversation related to the corresponding social object. When tab 605 is selected, an API to social network server 10 and social network 100 is used to provide the integration.

In the example of FIG. 6, tab 605 is selected to generate a conversation. However, because the object is not yet shared, a message 607 indicates that the object is not yet shared, and a "Share" button 609 is provided to share the object. Sharing the object causes a social object to be generated that corresponds to business object 600. An API to social network server 10 and social network 100 is used to generate the social object.

Figure 7:
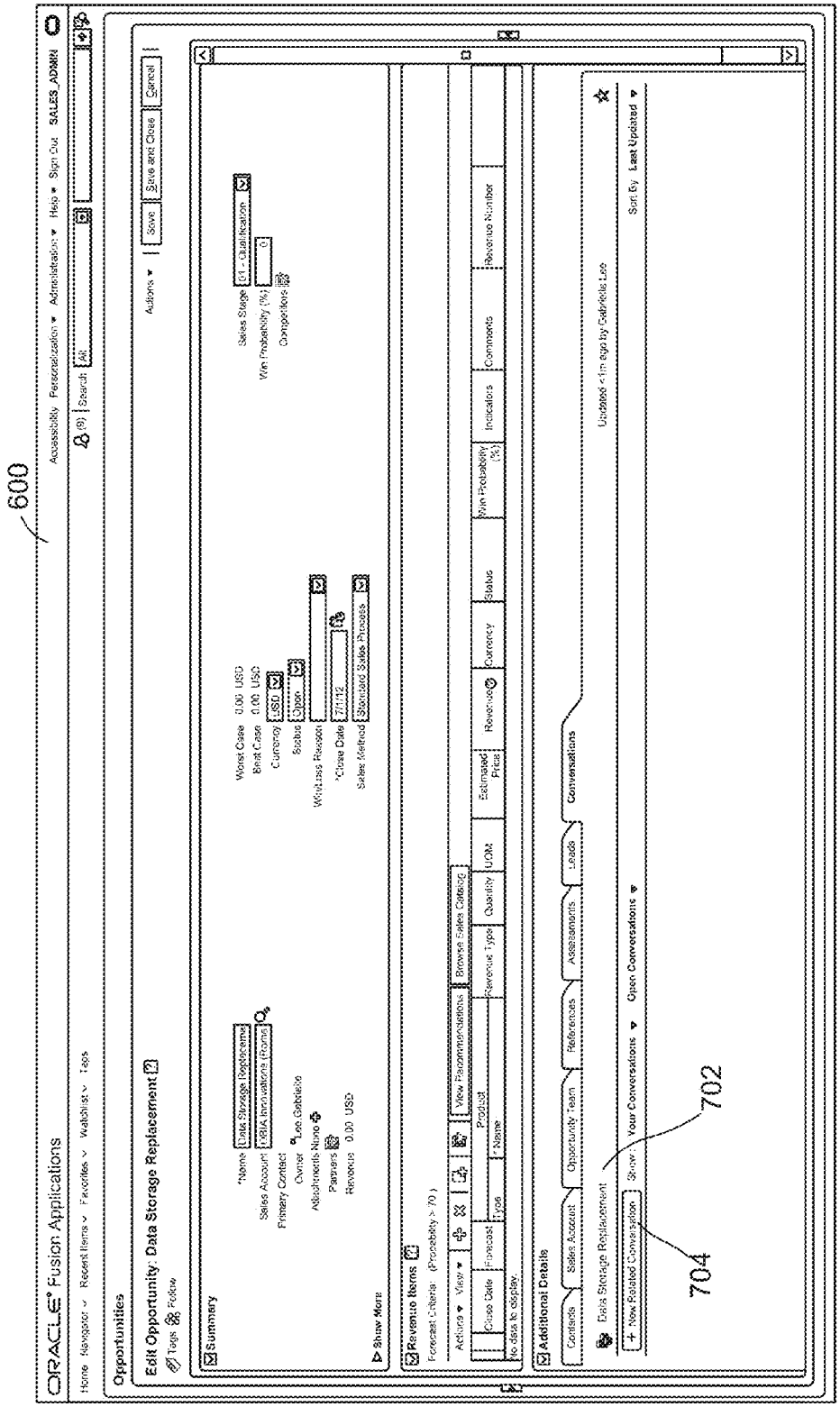
FIG. 7 is a screenshot showing the example business object of FIG. 6 after the share button has been selected in accordance with an embodiment of the present invention.

FIG. 7 is a screenshot showing the example business object 600 of FIG. 6 after Share button 609 has been selected in accordance with an embodiment of the present invention. As shown at 702, a "Data Storage Replacement" social object has been created in social network 100. Business object 600 further includes a "New Related Conversation"

button 704 that can be selected to create a new conversation related to the corresponding "Data Storage Replacement" social object.

Figure 8:
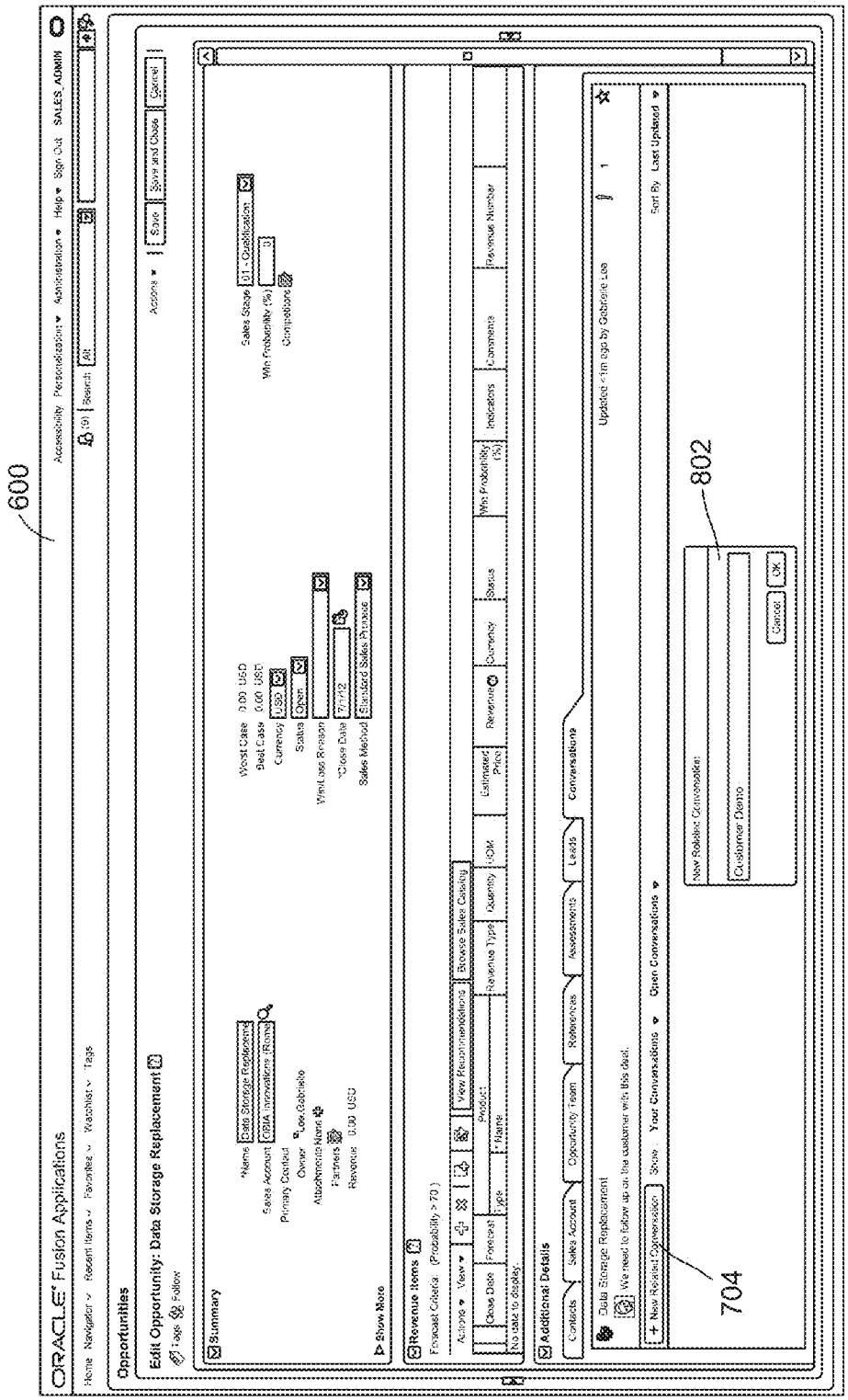
FIG. 8 is a screenshot showing the example business object of FIG. 7 after the New Related Conversation button has been selected in accordance with an embodiment of the present invention.

FIG. 8 is a screenshot showing the example business object 600 of FIG. 7 after New Related Conversation button 704 has been selected in accordance with an embodiment of the present invention. A window 802 pops up and the user can enter the name of the new conversation (e.g., "Customer Demo").

Figure 9:
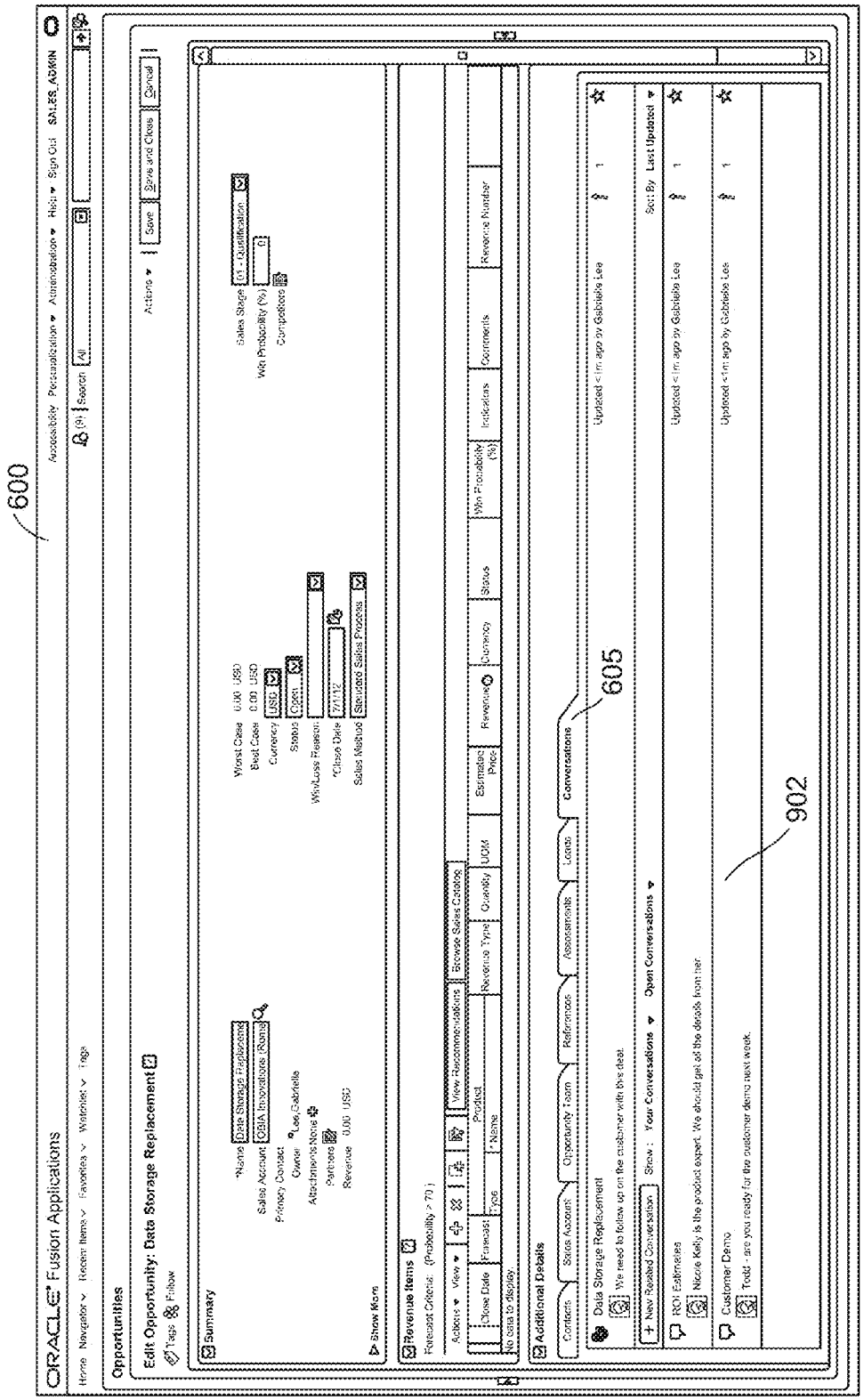
FIG. 9 is a screenshot showing the example business object of FIG. 6 after the conversations tab is selected in accordance with an embodiment of the present invention.

FIG. 9 is a screenshot showing the example business object 600 of FIG. 6 after conversations tab 605 is selected in accordance with an embodiment of the present invention. When tab 605 is selected, now that a social object has been created, all related conversations are displayed at 902. As shown, for the Data Storage Replacement social object, there are two related conversation: "ROI Estimates" and "Customer Demo." In FIG. 9, the related conversations are viewed in-context within the associated system of record. However they also may be viewed from within social network 100, as shown in FIG. 3, where the related conversations will be listed for user selection at 315 of FIG. 3.

Figure 10:
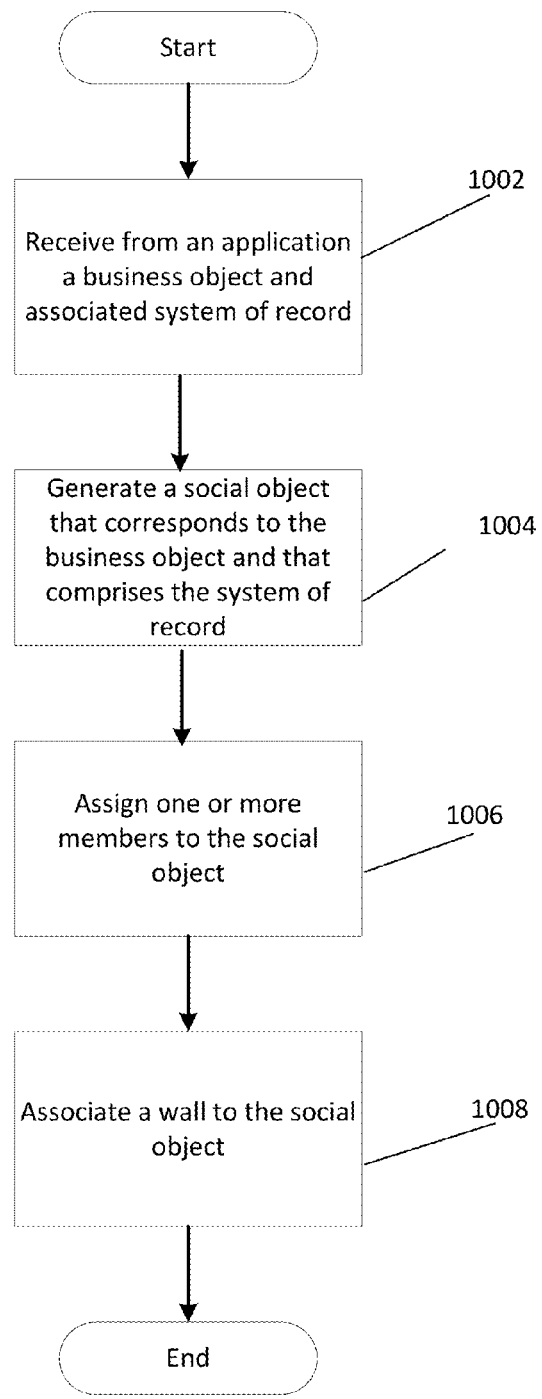
FIG. 10 is a flow diagram of the functionality of the social network module of FIG. 2 when generating a social object from a business object in accordance with one embodiment.

FIG. 10 is a flow diagram of the functionality of social network module 16 of FIG. 2 when generating a social object from a business object and system of record in accordance with one embodiment. In one embodiment, the functionality of the flow diagram of FIG. 10, and FIG. 11 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1002, social network module 16 receives from an application a business object and associated system of record. In one embodiment, the application is an enterprise application such as a CRM or ERP application. An example of a system of record for a business object is shown in section 602 of FIG. 6. An API to social network server 10 and social network 100 of FIG. 1 is used to receive the business object.

At 1004, social network module 16 generates a social object that corresponds to the business object and that comprises the system of record. An example of a social object is social object 300 of FIG. 3, in which the system of record is shown in section 301.

At 1006, social network module 16 assigns one or more members to the social object. An example of assigned members are members 310 of social object 300 of FIG. 3.

At 1008, social network module 16 associates a wall to the social object. The wall displays changes to the system of record. An example of a wall is wall 302 of social object 300 of FIG. 3.

Figure 11:
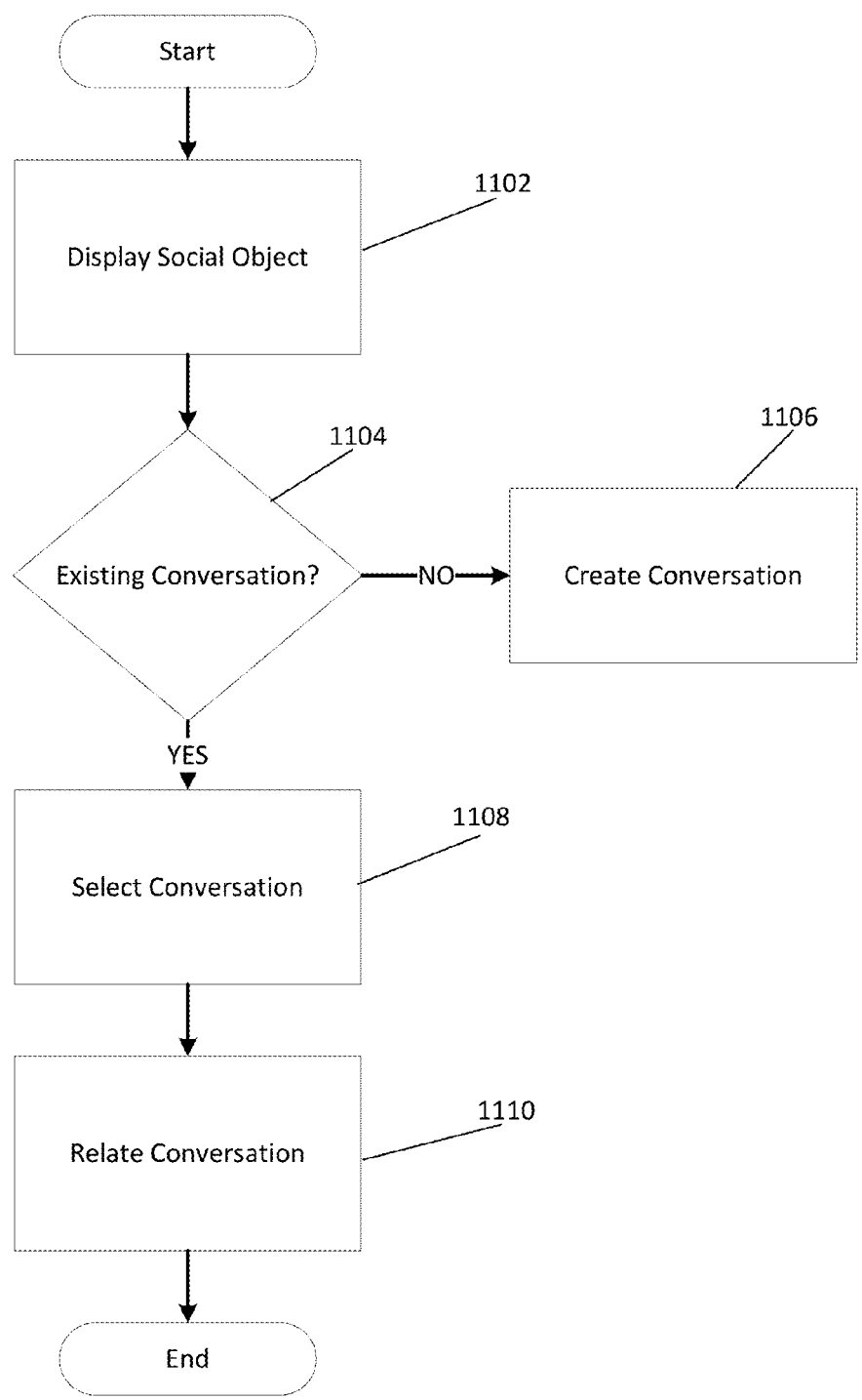
FIG. 11 is a flow diagram of the functionality of the social network module of FIG. 2 when relating a conversation to a social object in accordance with one embodiment.

FIG. 11 is a flow diagram of the functionality of social network module 16 of FIG. 2 when relating a conversation to a social object in accordance with one embodiment.

At 1102, the social object is displayed (assuming it has been created) with the system of record. For example, as shown in FIG. 7, social object 702 is displayed within the system of record for data storage replacement opportunity.

At 1104, it is determined if there are any existing conversations for the social object. If no at 1104, a conversation is created at 1106. The new conversation at 1106 is automatically related to the social object.

If conversations exist 1104, the conversation is selected at 1108, and the conversation is then related to the social object at 1110.

The functionality of FIG. 11 can be performed within an enterprise application, as shown in FIGS. 6-9, or within social network 100. An API to social network server 10 and social network 100 is used to provide the integration of FIG. 11.

As disclosed, social network 100 allows a social object to be generated and one or more conversations can be related to the social object. The social object is a set of properties tied to a wall. These properties are directly connected to the object in the system of record, and are updated either when they are changed in the system of record directly, or through actions in social network 100. Changes made within social network 100 are pushed back to the system of record to keep the object's properties current at all times. All changes can be logged on the wall, and related conversations can easily be created to discuss specific issues concerning the social object. The social object can be exposed through any type of applications, including the web client, "Outlook" from Microsoft Corp., or other email applications, standalone embeddable clients, and all mobile clients.

Social network 100 includes a set of predefined integration mechanisms that enable the user to define how and what data is retrieved from the system of record, how to display that data in social network 100 (for example, through social objects) and who within social network 100 has access to the data.

These predefined mechanisms are built to handle the most common application chores, such as specifying membership lists in social network 100 and property sensitivity (i.e., not everyone should be able to see or update all properties without authorization), and updating properties in both directions. For example, when a social object property is updated in the system of record, that change is published in social network 100 based on the user permission rules that the user has defined.

Social objects are defined in social network 100 as records within a system of records, such as customer or service records from a CRM system. Social object records include metadata and a wall, which includes membership lists and related conversations. Social objects expose system of record information to users who interact with and collaborate around the data through a user interface of social network 100.

The social objects provide a uniform and collaborative view of information from all integrated systems of record. The social objects provide a wide range of services and capabilities in one embodiment, including:

Displaying select metadata needed for collaboration via an extensible gadget, usually visible as part of a wall;

Receiving a data stream of important activities fed by an activity stream or a web service from a system of records;

Enabling users to post messages, create follow ups, and easily catch up with activity through persisted and related conversations;

Enabling controlled access and collaboration with others via membership lists and rules;

Linking to other social objects; and

Starting related conversations to the social object.

As an example of the functionality of a social object, after a CRM Opportunity social object retrieves a stream of data input from the social object's wall, the process may unfold as follows:

1. Changes in the Opportunity's status, forecast, and revenue are published to the Opportunity's Wall.

2. The new information is shared with a broader group of individuals, who provide more context to the Opportunity.

3. Users not directly tied to the CRM Opportunity team can now interact and react to the Opportunity's status. For example, if the Opportunity is won, that may be the Service organization's cue to take over and begin the implementation process. The Service organization can then publish that information on the Opportunity's Wall.

Communication also works in the other direction. When the Opportunity is updated from within social network 100, the change is reflected in the system of record as well. Before the change is made, social network 100 checks to ensure that the user has the right to update the object, from changing a simple property to changing the state of the object (for example from "Pending" to "Won"). There is no need to go back into CRM to update key fields as social network 100 automatically provides the updates.

Therefore, as disclosed, embodiments generate social objects related to enterprise application business objects and systems of record. Multiple conversations related to the social objects, with potentially varied membership, can be created and stored for future reference. Further, updates to social objects are automatically reflected in corresponding business objects, and vice versa.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide a social network, the providing the social network comprising:
   receiving from an enterprise application a business object, associated business object data comprising records for the enterprise application and corresponding enterprise members, wherein the enterprise members comprise an enterprise team assigned to the business object;
   generating a social object for the social network that corresponds to the business object and the business object data and comprises related conversations;
   assigning one or more social members to the social object, wherein the social members comprise the enterprise team and additional members of the social network and wherein a set of the social members is different than a set of the enterprise members and at least one of the social members is not a user of the enterprise application;
   receiving first changes to the associated business object data and, in response, modifying the social object to incorporate the first changes; and
   providing second changes to the social object to the enterprise application, wherein the enterprise application, in response, modifies the associated business object data to incorporate the second changes.

2. The non-transitory computer readable medium of claim 1, further comprising:
   relating one or more conversations to the social object, wherein the conversations can be initiated by any of the set of the social members.

3. The non-transitory computer readable medium of claim 2, wherein each conversation comprises a shared stream of posts and comments.

4. The non-transitory computer readable medium of claim 2, wherein the first changes to the associated business object data comprise a change to a customer record.

5. The non-transitory computer readable medium of claim 2, wherein the relating comprises selecting a conversation within a user interface corresponding to the business object.

6. The non-transitory computer readable medium of claim 1, further comprising:
   associating a wall to the social object, wherein the wall displays the first changes to the associated business object data.

7. The non-transitory computer readable medium of claim 1, wherein the enterprise application comprises a customer relationship management (CRM) application or an enterprise resource planning (ERP) application.

8. A computer implemented method to provide a social network, the method comprising:
   receiving from an enterprise application a business object, associated business object data comprising records for the enterprise application and corresponding enterprise members, wherein the enterprise members comprise an enterprise team assigned to the business object;
   generating a social object for the social network that corresponds to the business object and the business object data and comprises related conversations;
   assigning one or more social members to the social object, wherein the social members comprise the enterprise team and additional members of the social network and wherein a set of the social members is different than a set of the enterprise members and at least one of the social members is not a user of the enterprise application;
   receiving first changes to the associated business object data and, in response, modifying the social object to incorporate the first changes; and
   providing second changes to the social object to the enterprise application, wherein the enterprise application, in response, modifies the associated business object data to incorporate the second changes.

9. The method of claim 8, further comprising:
   relating one or more conversations to the social object, wherein the conversations can be initiated by any of the set of the social members.

10. The method of claim 9, wherein each conversation comprises a shared stream of posts and comments.

11. The method of claim 9, wherein the first changes to the associated business object data comprise a change to a customer record.

12. The method of claim 9, wherein the relating comprises selecting a conversation within a user interface corresponding to the business object.

13. The method of claim 8, further comprising:
   associating a wall to the social object, wherein the wall displays the first changes to the associated business object data.

14. The method of claim 8, wherein the enterprise application comprises a customer relationship management (CRM) application or an enterprise resource planning (ERP) application.

15. A social network system comprising:
   a processor;
   a computer readable medium coupled to the processor and storing a social network module that is executed by the processor to provide a social network, the social network comprising:
   receiving from an enterprise application a business object, associated business object data comprising records for the enterprise application and corresponding enterprise members, wherein the enterprise members comprise an enterprise team assigned to the business object;

generating a social object for the social network that corresponds to the business object and the business object data and comprises related conversations;

assigning one or more social members to the social object, wherein the social members comprise the enterprise team and additional members of the social network and wherein a set of the social members is different than a set of the enterprise members and at least one of the social members is not a user of the enterprise application;

receiving first changes to the associated business object data and, in response, modifying the social object to incorporate the first changes; and providing second changes to the social object to the enterprise application, wherein the enterprise application, in response, modifies the associated business object data to incorporate the second changes.

16. The social network system of claim 15, wherein the social object is hosted in a social network server and the business object is hosted in an enterprise application server.

17. The social network system of claim 15, further comprising:
relating one or more conversations to the social object, wherein the conversations can be initiated by any of the set of the social members.

18. The social network system of claim 15, further comprising:
associating a wall to the social object, wherein the wall displays the first changes to the associated business object data.

19. The social network system of claim 15, wherein the enterprise application comprises a customer relationship management (CRM) application or an enterprise resource planning (ERP) application.

20. The social network system of claim 19, wherein the first changes to the associated business object data comprise a change to a customer record.

* * * * *

UNITED STATES PATENT AND TRADEMARK OFFICE
CERTIFICATE OF CORRECTION

| | |
|---|---|
| PATENT NO. | : 9,626,728 B2 |
| APPLICATION NO. | : 15/130376 |
| DATED | : April 18, 2017 |
| INVENTOR(S) | : Chakraborty et al. |

Page 1 of 1

It is certified that error appears in the above-identified patent and that said Letters Patent is hereby corrected as shown below:

On page 2, Column 2, under Other Publications, Line 20, delete ".mircorsoft." and insert -- .microsoft. --, therefor.

On page 2, Column 2, under Other Publications, Line 28, delete ".jivesofware." and insert -- .jivesoftware. --, therefor.

On page 2, Column 2, under Other Publications, Line 43, delete "Seach" and insert -- Search --, therefor.

In Column 2, Line 46, delete "by" and insert -- be --, therefor.

In Column 4, Line 3, delete "and or" and insert -- and/or --, therefor.

In Column 6, Line 41, after "FIG. 4" insert -- . --.

Signed and Sealed this
Third Day of October, 2017

Joseph Matal
*Performing the Functions and Duties of the*
*Under Secretary of Commerce for Intellectual Property and*
*Director of the United States Patent and Trademark Office*